US008385321B2

(12) United States Patent
Tien (10) Patent No.: US 8,385,321 B2
(45) Date of Patent: Feb. 26, 2013

(54) METHOD AND SYSTEM FOR SYNCHRONIZING A DATA BASE AT A PLURALITY OF NODES IN AN AD HOC NETWORK

(75) Inventor: Chien-Wen Tien, Plano, TX (US)

(73) Assignee: Alcatel Lucent, Paris (FR)

( * ) Notice: Subject to any disclaimer, the term of this patent is extended or adjusted under 35 U.S.C. 154(b) by 593 days.

(21) Appl. No.: 12/462,291

(22) Filed: Jul. 31, 2009

(65) Prior Publication Data

US 2011/0026513 A1 Feb. 3, 2011

(51) Int. Cl.
*H04J 3/06* (2006.01)
(52) U.S. Cl. .......................................................... 370/350
(58) Field of Classification Search .................. 370/350, 370/338, 328
See application file for complete search history.

(56) References Cited

U.S. PATENT DOCUMENTS 8,032,559 B2 * 10/2011 Ring et al. ..................... 707/792
2004/0246902 A1 * 12/2004 Weinstein et al. ............ 370/238

* cited by examiner

*Primary Examiner* — Mark Rinehart
*Assistant Examiner* — Mohammad Anwar
(74) *Attorney, Agent, or Firm* — Carmen Patti Law Group, LLC (57) ABSTRACT

A method for synchronizing a data base at a plurality of nodes in an ad hoc network including at least one authentication node group; each authentication node group including a leader node and at least one member node; the method includes: (a) in each respective authentication node group, comparing and identifying differences between the data base at the respective leader node and the data base at each respective member node; (b) for each comparing, if the differences are identified, exchanging data bases between the leader node and the member node; and (c) for each comparing, in no particular order: (1) merging the leader node data base with the member data base at the leader node to create a leader node merged data base; and (2) merging the member node data base with the leader data base at the member node to create a member node merged data base.

16 Claims, 7 Drawing Sheets

METHOD AND SYSTEM FOR SYNCHRONIZING A DATA BASE AT A PLURALITY OF NODES IN AN AD HOC NETWORK

FIELD OF THE INVENTION

The present invention is directed to telecommunication systems, and especially to synchronizing a data base at a plurality of nodes in an ad hoc network.

BACKGROUND OF THE INVENTION

In an ad hoc network, all nodes are mobile and may move into or out of the network at any time. It is difficult task to ensure that data stored at all nodes in the network is the same.

Earlier solutions to ensuring the same data is stored on various nodes in a network involves predefining master and slave relationships. Such relationships may be established and enforced in a fixed network. However, in dynamically changing network (e.g., in ad hoc networks) predetermined master and slave relationships are substantially meaningless and substantially unenforceable if ever defined.

There is a need for a method and system method for synchronizing a data base at a plurality of nodes in an ad hoc network.

SUMMARY OF THE INVENTION

A method for synchronizing a data base at a plurality of nodes in an ad hoc network including at least one authentication node group; each authentication node group including a leader node and at least one member node; the method includes: (a) in each respective authentication node group, comparing and identifying differences between the data base at the respective leader node and the data base at each respective member node; (b) for each comparing, if the differences are identified, exchanging data bases between the leader node and the member node; and (c) for each comparing, in no particular order: (1) merging the leader node data base with the member data base at the leader node to create a leader node merged data base; and (2) merging the member node data base with the leader data base at the member node to create a member node merged data base.

A system for synchronizing a data base at a plurality of nodes in an ad hoc network including at least one authentication authority node group; each respective authentication authority node group of the at least one authentication authority node group including a respective group leader node and at least one group member node; the system includes: (a) in each respective node, a respective comparing unit; the respective comparing unit in each respective node of each respective authentication authority node group comparing and identifying differences between at least one predetermined aspect of the data base at the respective group leader node and the at least one predetermined aspect of the data base at each respective group member node; (b) in each respective node, a respective communicating unit; if the differences identified exceed a predetermined measure, the respective communicating units for the respective group leader node and the respective group member node effect an exchanging of data bases between the group leader node and the group member node; and (c) in each respective node, a respective data base server unit; each respective data base server unit being employed to effect, in no particular order: (1) merging the group leader node data base with the group member data base at the group leader node to create a group leader node merged data base; and (2) merging the group member node data base with the group leader data base at the group member node to create a group member node merged data base.

It is, therefore a feature of the present invention to provide a method and system method for synchronizing a data base at a plurality of nodes in an ad hoc network.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
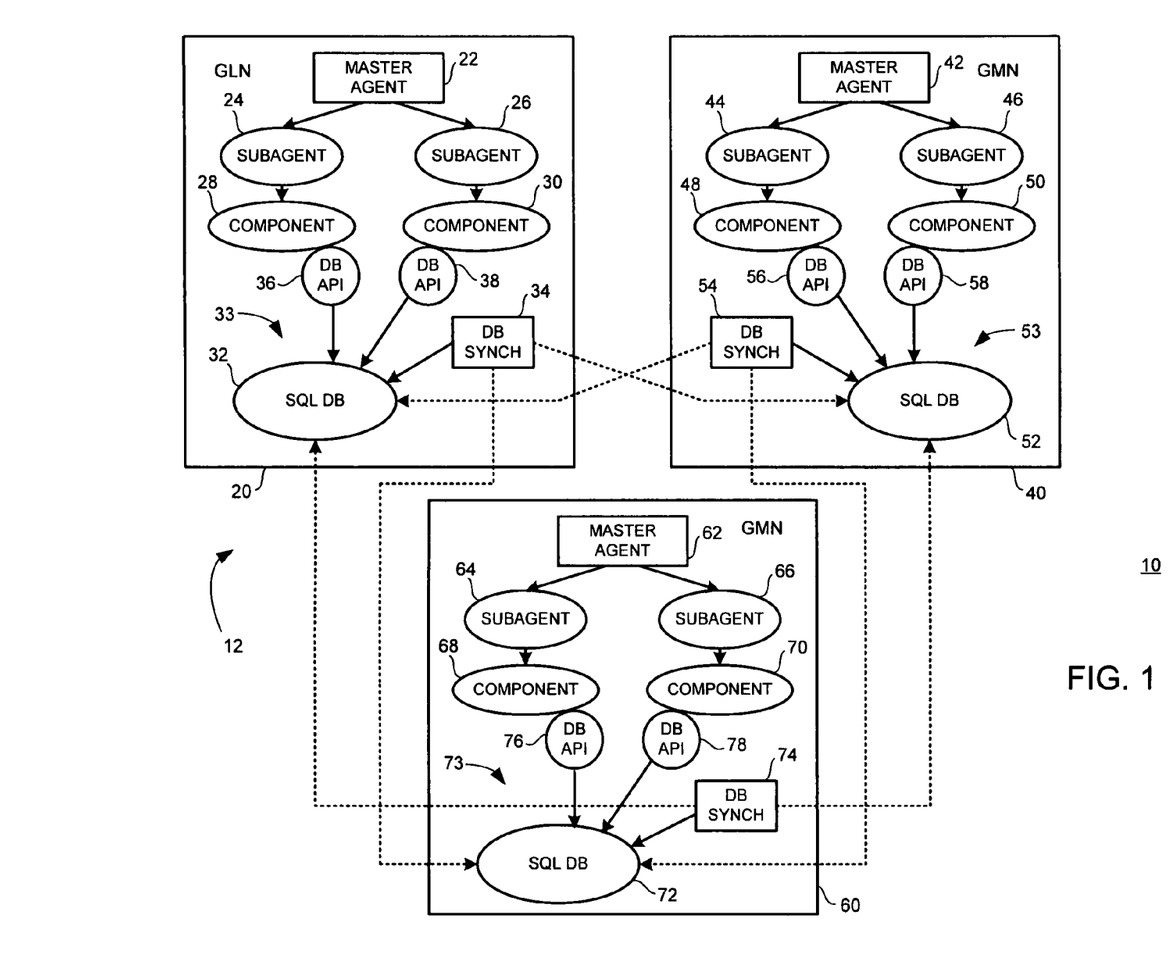
FIG. 1 is a schematic diagram illustrating a plurality of nodes coupled in an ad hoc network.

FIG. 1 is a schematic diagram illustrating a plurality of nodes coupled in an ad hoc network. In FIG. 1, a network 10 is configured as an ad hoc network. For purposes of this disclosure, an ad hoc network is a communication network including nodes that may freely enter and leave the network. By way of example and not by way of limitation, a WiFi mesh network or similar network.

Network 10 includes nodes 20, 40, 60. Nodes 20, 40, 60 are coupled together to establish a cluster or group 12, and may be configured as an authentication authority node group 12. That is, nodes 20, 40, 60 may be configured to mutually recognize each other as members of their respective cluster 12 using an authentication routine or protocol.

Node 20 is a group leader node (GLN). Nodes 40, 60 are group member nodes (GMN). Node 20 includes a master agent unit 22 coupled with subagents 24, 26. Subagent 24 is coupled with a component 28, and subagent 26 is coupled with a component 30. Components 28, 30 are representative only. There may be more components in node 20. Components may be configured for addressing specific aspects of operation of a node. By way of example and not by way of limitation, components in node 20 may include Authentication, Authorization & Accounting (AAA), Quality of Service (QoS), Backhaul (control of the backhaul portions of network 10; backhaul portion—intermediate links between the core, or backbone, of the network and the small subnetworks at the "edge" of the entire hierarchical network), Mesh (control of operation of the mesh aspects of network 10), WiMax (control of operation of WiMax portions of network 10) and Autoconfig (automatic control of certain fundamental aspects of operation network 10). Node 20 also includes a data base server unit 33. Data base server unit 33 includes a data base server 32 coupled with a communication unit 34. Communication unit 34 may be embodied in a data base synchronizing unit (DB SYNCH). Communication unit 34 is coupled with other nodes 40, 60 to effect data base synchronization, as will be described in greater detail below. Components 28, 30 communicate with data base server 32 via data base Application Programming Interface (DB API) units 36, 38.

Node 40 includes a master agent unit 42 coupled with subagents 44, 46. Subagent 44 is coupled with a component 48, and subagent 46 is coupled with a component 50. Components 48, 50 are representative only. There may be more components in node 40. Components may be configured for addressing specific aspects of operation of a node. By way of example and not by way of limitation, components in node 40 may include Authentication, Authorization & Accounting (AAA), Quality of Service (QoS), Backhaul (control of the backhaul portions of network 10; backhaul portion—intermediate links between the core, or backbone, of the network and the small subnetworks at the "edge" of the entire hierarchical network), Mesh (control of operation of the mesh aspects of network 10), WiMax (control of operation of WiMax portions of network 10) and Autoconfig (automatic control of certain fundamental aspects of operation network 10). Node 40 also includes a data base server unit 53. Data base server unit 53 includes a data base server 52 coupled with a communication unit 54. Communication unit 54 may be embodied in a data base synchronizing unit (DB SYNCH). Communication unit 54 is coupled with other nodes 20, 60 to effect data base synchronization, as will be described in greater detail below. Components 48, 50 communicate with data base server 52 via data base Application Programming Interface (DB API) units 56, 58.

Node 60 includes a master agent unit 62 coupled with subagents 64, 66. Subagent 64 is coupled with a component 68, and subagent 66 is coupled with a component 70. Components 68, 70 are representative only. There may be more components in node 60. Components may be configured for addressing specific aspects of operation of a node. By way of example and not by way of limitation, components in node 40 may include Authentication, Authorization & Accounting (AAA), Quality of Service (QoS), Backhaul (control of the backhaul portions of network 10; backhaul portion—intermediate links between the core, or backbone, of the network and the small subnetworks at the "edge" of the entire hierarchical network), Mesh (control of operation of the mesh aspects of network 10), WiMax (control of operation of WiMax portions of network 10) and Autoconfig (process for automatic control of certain fundamental aspects of operation network 10). Node 60 also includes a data base server unit 73. Data base server unit 73 includes a data base server 72 coupled with a communication unit 74. Communication unit 74 may be embodied in a data base synchronizing unit (DB SYNCH). Communication unit 74 is coupled with other nodes 20, 40 to effect data base synchronization, as will be described in greater detail below. Components 68, 70 communicate with data base server 72 via data base Application Programming Interface (DB API) units 76, 78.

Some static persistent data in network 10 may need to be communicated across Mobile Network Nodes (MNNs) 20, 40, 60. A database synchronization subsystem is used to propagate data from one MNN to another MNN within the same administrative authority group in a cluster within network 10.

During initialization when a cluster or network 10 (network 10 may include only one cluster) is just being formed, it is important to bring the data on all the MNNs within the same organization "up-to-date". Synchronization of the existing data only takes place when there are at least two nodes in the same authentication authority (organization). A group leader is elected by an Autoconfig process (a process known to those skilled in the art of communication network design) in each organization. The group leader in each organization or group merges all the data and distributes the merged data to all group member MNNs. The Autoconfig process on the Primary Services Node (PSN) 20 sends the group leader information to data base server unit 33 on PSN 20. In the exemplary cluster or network 10 of FIG. 1, node 20 is designated as a Group Leader Node (GLN) and may be regarded in the simplified arrangement illustrated in FIG. 1 as the PSN and as the group leader node. Whenever a new node is joining cluster 10, the Autoconfig process on PSN 20 provides data base server unit 33 on PSN 20 with the new node information. Data base server unit 33 on PSN 20 constructs a route table and distributes the route table to all nodes 20, 40, 60 in cluster 10. The Autoconfig process determines the group leader in each organization and sends that information (determination of group leader) to data base server unit 33 on PSN 20. Data base server unit 33 on PSN 20 then distributes that information (determination of group leader) to each node 20, 40, 60 in the same organization.

Each authentication authority group (cluster) may have a group leader node (GLN), and some group member nodes (GMN). As a practical matter, the number of nodes in a group may vary from 1 to 20 or more. Each GMN sends its table checksums to the GLN for comparison. If all table checksums match, a CHECKSUM_MATCH acknowledgement may be sent back to the GMN and no initialization synchronization is needed. If any of the table checksums do not match, the data base server unit of the GLN would send a CHECKSUM_MISMATCH acknowledgement to the GMN. The GMN would send the table to the GLN. After the GLN receives the table, the GLN compares the contents of the tables, merges the tables, and updates all the databases on all the nodes in the same organization. If there were any mismatches on any entry in a table, the data base server unit compares the timestamps, and the newest entry is entered into the final master table.

When any new node joins before initial synchronization is completed in a cluster, the new node is processed in the same fashion. If there are multiple nodes belonging to the same group joining a cluster at the same time, the multiple nodes are preferably processed substantially simultaneously. Multiple copies of a table may be compared and merged simultaneously. A Flag (e.g., initialSyncFlag=0 by default) is used for each organization to indicate whether an organization has completed initial synchronization, and the Flag may be set to "1" when initial synchronization has been completed.

If any node joins the group after the completion of initial synchronization (e.g., initialSyncFlag=1), instead of merging tables with the GLN a joining node may merge tables with one of a neighboring node in its organization.

Figure 2:
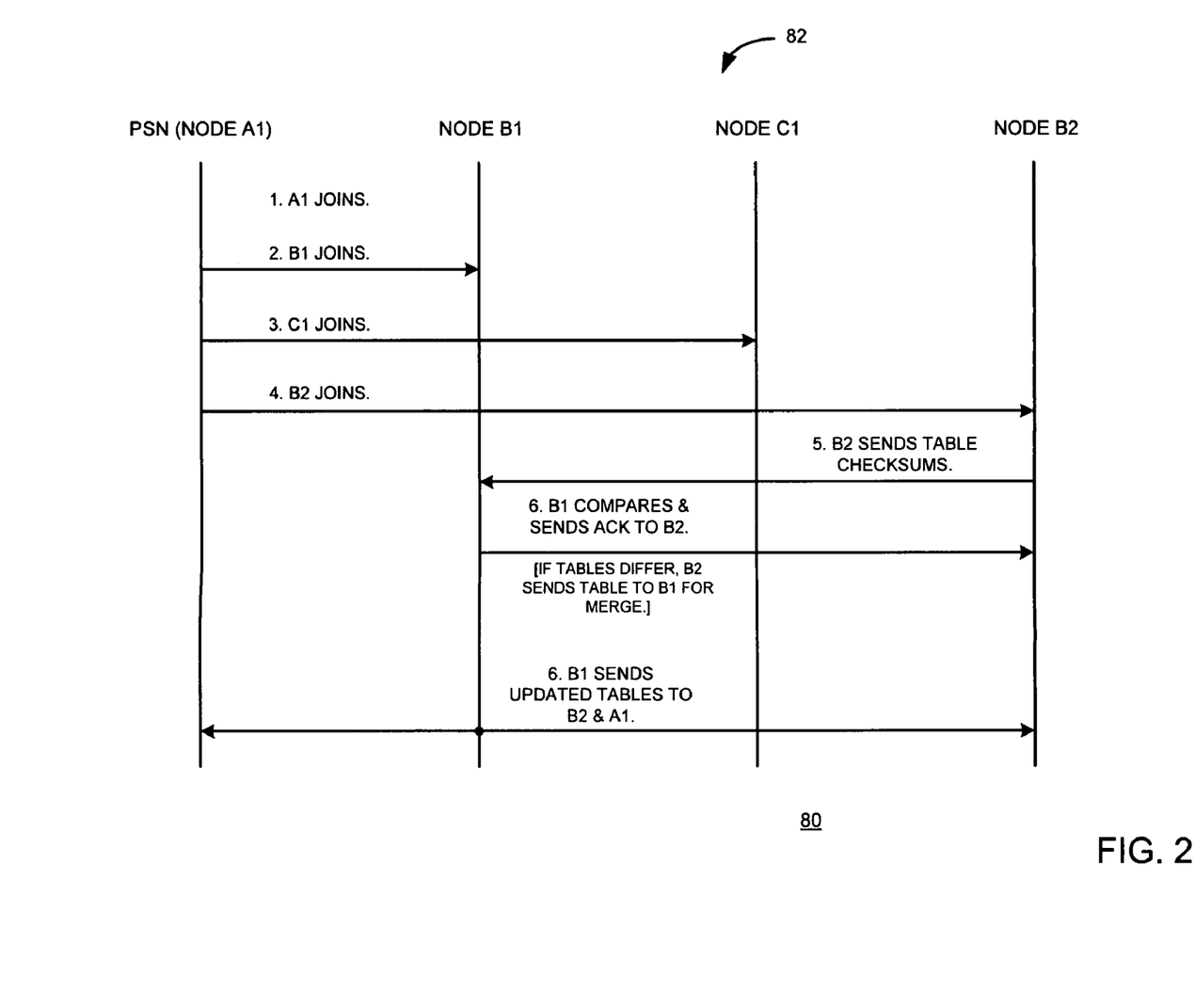
FIG. 2 is a schematic sequence diagram illustrating a process relating to initial data base synchronization as a network is formed.

FIG. 2 is a schematic sequence diagram illustrating a process relating to initial data base synchronization as a network is formed. In FIG. 2, a sequence diagram 80 involves a cluster 82 of nodes including a node A1, a node B1, a node C1 and a node B2. By way of example and not by way of limitation, an assumption is made in FIG. 2 in order to simplify the description of the invention: The first node in the organization joining a cluster gets elected as the group leader node. Given this assumption, in FIG. 2 node A1 is elected as a group leader node and the Primary Service Node (PSN) for cluster 82. The sequence relating to initial data base synchronization is substantially as follows:

1. When node A1 (i.e., node 1 in organization A) joins cluster 82, an automatic configuration process (understood by those skilled in the art of communication network design) elects node A1 as the group leader for cluster 82 and sends a node join notification to a communication unit (not shown in FIG. 2; see communication units 34, 454, 74; FIG. 1) in a data base server unit (not shown in FIG. 2; see data base server units 33, 53, 73; FIG. 1) on the PSN. The data base server unit on the PSN (node A1), adds node A1 to a route table relating routing to members of cluster 82.
2. When node B1 (node 1 in organization B) joins cluster 82, the automatic configuration process elects node B1 as the group leader in organization B and sends a node join notification to the data base server unit on the PSN (node A1). The data base server unit on the PSN adds node B1 to the route table.
3. When node C1 (node 1 in organization C) joins cluster 82, the automatic configuration process elects node C1 as the group leader in organization C and sends a node join notification to the data base server unit on the PSN. The data base server unit on the PSN adds node C1 to the route table.
4. When node B2 (node 2 in organization B) joins cluster 82, the automatic configuration process sends a node join notification to the data base server unit on the PSN. The data base server unit on the PSN adds node B2 to the route table and sends the organization B route table to nodes B1, B2 including the group leader information for node B1.
5. When node B2 receives the route table information, node B2 sends table checksums to the data base server unit on node B1 (group leader in organization B) for comparison by node B1 with table checksums held by node B1. Table checksums are a summary indication of contents of a table, a technique understood by those skilled in the art of communication network design.
6. When node B1 receives the table checksum information from node B2, node B1 compares node B2 checksum information with node B1 checksum information. If all table checksums match, node B1 sets an initial sync flag to "1" indicating the initial database synchronization has been completed. However, if there is any table checksum mismatch, node B1 sends a CHECKSUM_MISMATCH acknowledgement to node B2. Node B2 then sends the entire table that has failed the checksum comparison to node B1 for merging.
7. When node B1 receives the table from node B2, node B1 starts a merging process generally as follows:
    Comparison: Comparing each entry and look for any mismatched data.
    Buffering: When a mismatch is found, node B1 compares the timestamps of the entries in each of the two tables being compared and determines which entry is more up-to-date. Node B1 then writes the more up-to-date entry into a buffer in memory. Preferably only differences between the two data bases being compared are written in the buffers and updated. The buffer associated with node B1 would store the differences between the table originally stored by node B1 and the merged (new) table, and the buffer associated with node B2 would keep the differences between the table originally stored by node B2 and the merged (new) table. Such storing of differences only may avoid transmitting an entire merged table back to node B2 and may avoid unnecessary disk input-output.
    Update: After the table comparison is completed, merged data is updated in the buffers associated with nodes B1, B2.

Figure 3:
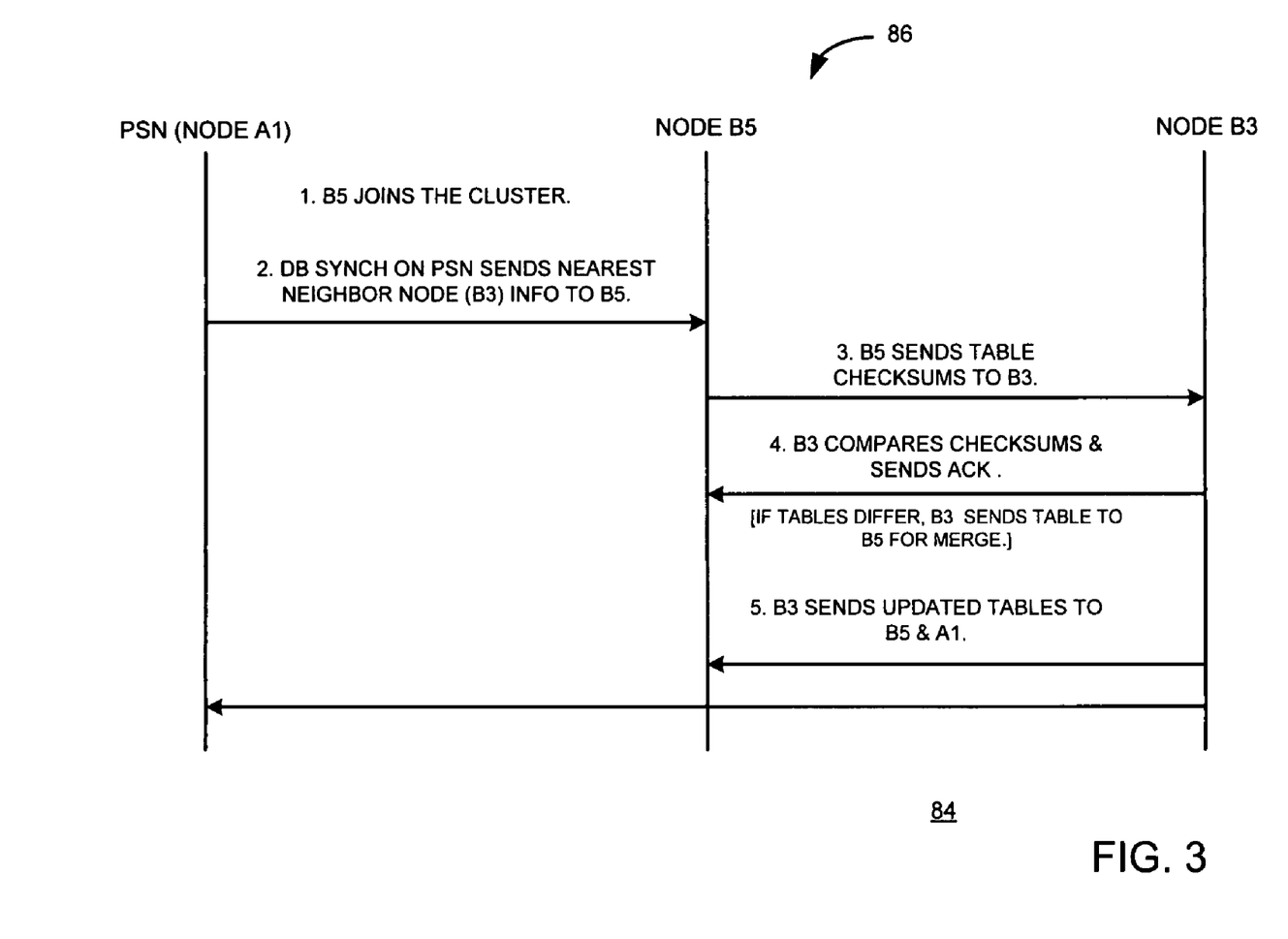
FIG. 3 is a schematic sequence diagram illustrating a process relating to a node joining a network after initial synchronization of the network is completed.

FIG. 3 is a schematic sequence diagram illustrating a process relating to a node joining a network after initial synchronization of the network is completed. In FIG. 3, a sequence diagram 84 involves a cluster 86 of nodes including a node A1, a node B5 and a node B3. The sequence relating to node B5 joining a network or cluster 86 after initial synchronization of cluster 86 is completed is substantially as follows:

1. When node B5 (node 5 in organization B) joins cluster 86, the automatic configuration process sends a node join notification to the communication unit of the data base server unit on the PSN (node A1).
2. Since organization B has completed initial synchronization, the data base server unit on the PSN sends information to node B5 relating to the nearest neighbor to node B5 (that is, node B3 in FIG. 3).
3. Node B5 starts to synchronize with its nearest neighbor (node B3) by sending table checksums to node B3.
4. If there are any mismatched table checksums, node B3 sends back a CHECKSUM_MISMATCH acknowledgement to node B5.
5. Node B5 sends the tables to node B3.
8. When node B3 receives the table from node B5, node B3 starts a merging process substantially as described in Step 7 in FIG. 2, as follows:
    Comparison: Comparing each entry and look for any mismatched data.
    Buffering: When a mismatch is found, node B3 compares the timestamps of the entries in each of the two tables being compared and determines which entry is more up-to-date. Node B3 then writes the more up-to-date entry into a buffer in memory. Preferably only differences between the two data bases being compared are written in the buffers and updated. The buffer associated with node B3 would store the differences between the table originally stored by node B3 and the merged (new) table, and the buffer associated with node B5 would keep the differences between the table originally stored by node B5 and the merged (new) table. Such storing of differences only may avoid transmitting an entire merged table back to node B5 and may avoid unnecessary disk input-output.
    Update: After the table comparison is completed, merged data is updated in the buffers associated with nodes B3, B5.

Figure 4:
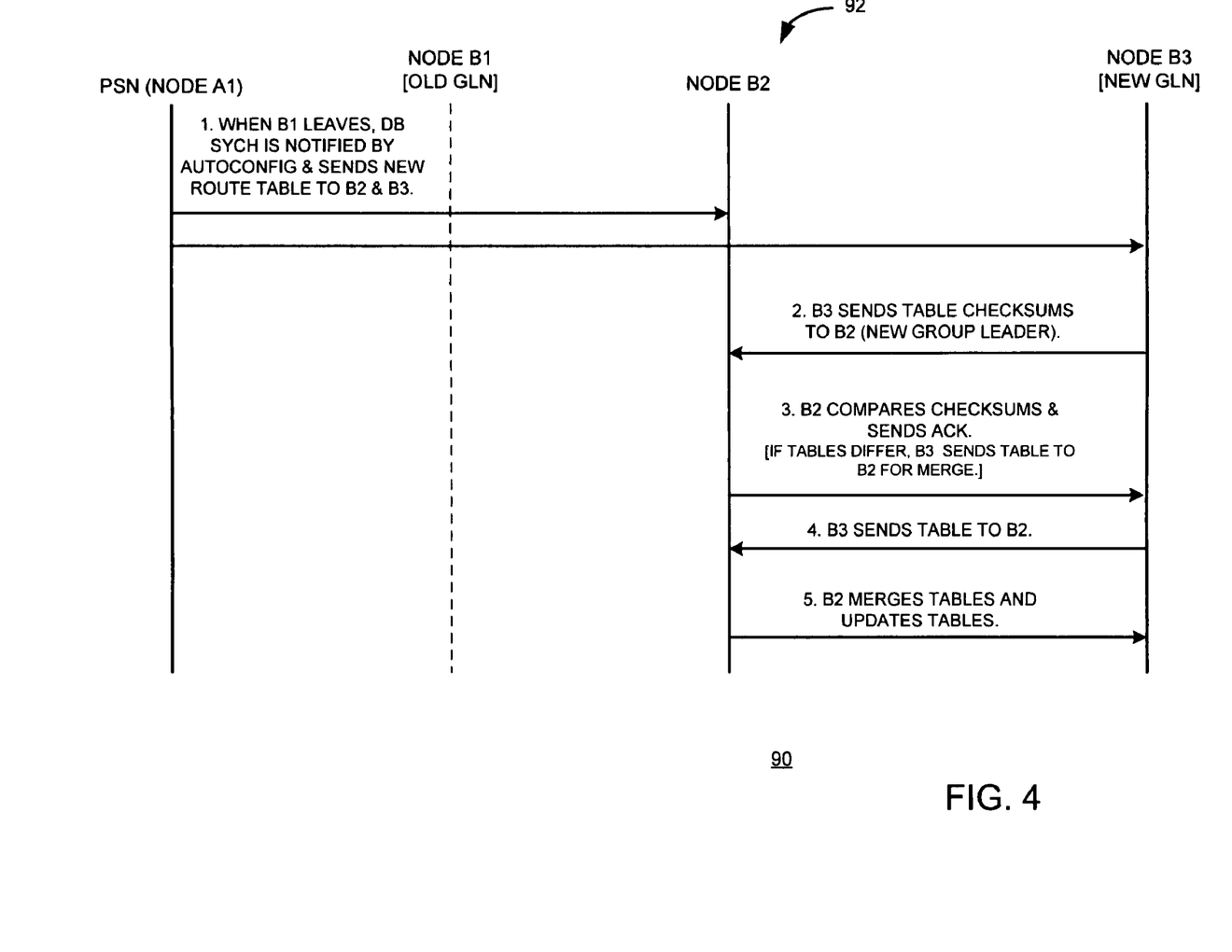
FIG. 4 is a schematic sequence diagram illustrating a process relating to a node leaving a network.

FIG. 4 is a schematic sequence diagram illustrating a process relating to a node leaving a network. In FIG. 4, a sequence diagram 90 involves a cluster 92 of nodes including a node A1, a node B1, a node B2 and a node B3. The sequence relating to a process relating to a node leaving a network is substantially as follows:

1. When a GMN leaves a cluster, the Autoconfig process sends a node leave notification to the data base server unit on the PSN (e.g., data base server unit 33 on node 20; FIG. 1). The data base server unit on the PSN removes the departing node from the route table and distributes a new route table to all remaining nodes in the organization.
2. If a GLN leaves a cluster when the initial synchronization has not yet completed, the Autoconfig process will elect another group leader node if there is at least one other node left in the same organization. All the remaining group member nodes then start to synchronize with the new elected group leader node.
3. If there are any mismatched table checksums, node B2 sends back a CHECKSUM_MISMATCH acknowledgement to node B3.
4. Node B3 sends the tables to node B2.
5. When node B3 receives the table from node B5, node B3 starts a merging process substantially as described in Step 7 in FIGS. 2 and 3, as follows:
   Comparison: Comparing each entry and look for any mismatched data.
   Buffering: When a mismatch is found, node B2 compares the timestamps of the entries in each of the two tables being compared and determines which entry is more up-to-date. Node B2 then writes the more up-to-date entry into a buffer in memory. Preferably only differences between the two data bases being compared are written in the buffers and updated. The buffer associated with node B2 would store the differences between the table originally stored by node B2 and the merged (new) table, and the buffer associated with node B3 would keep the differences between the table originally stored by node B3 and the merged (new) table. Such storing of differences only may avoid transmitting an entire merged table back to node B3 and may avoid unnecessary disk input-output.
   Update: After the table comparison is completed, merged data is updated in the buffers associated with nodes B2, B3.

When multiple clusters come close together without merging, nodes belonging to the same group communicate through their respective group leader node. In each cluster, the Autoconfig process on the local PSN (for the respective group) sends the node list, including the group leader information of the remote cluster, to the data base server unit on the local PSN. The data base server unit on the local PSN then distributes the route tables to the group leader of the local cluster.

Figure 5:
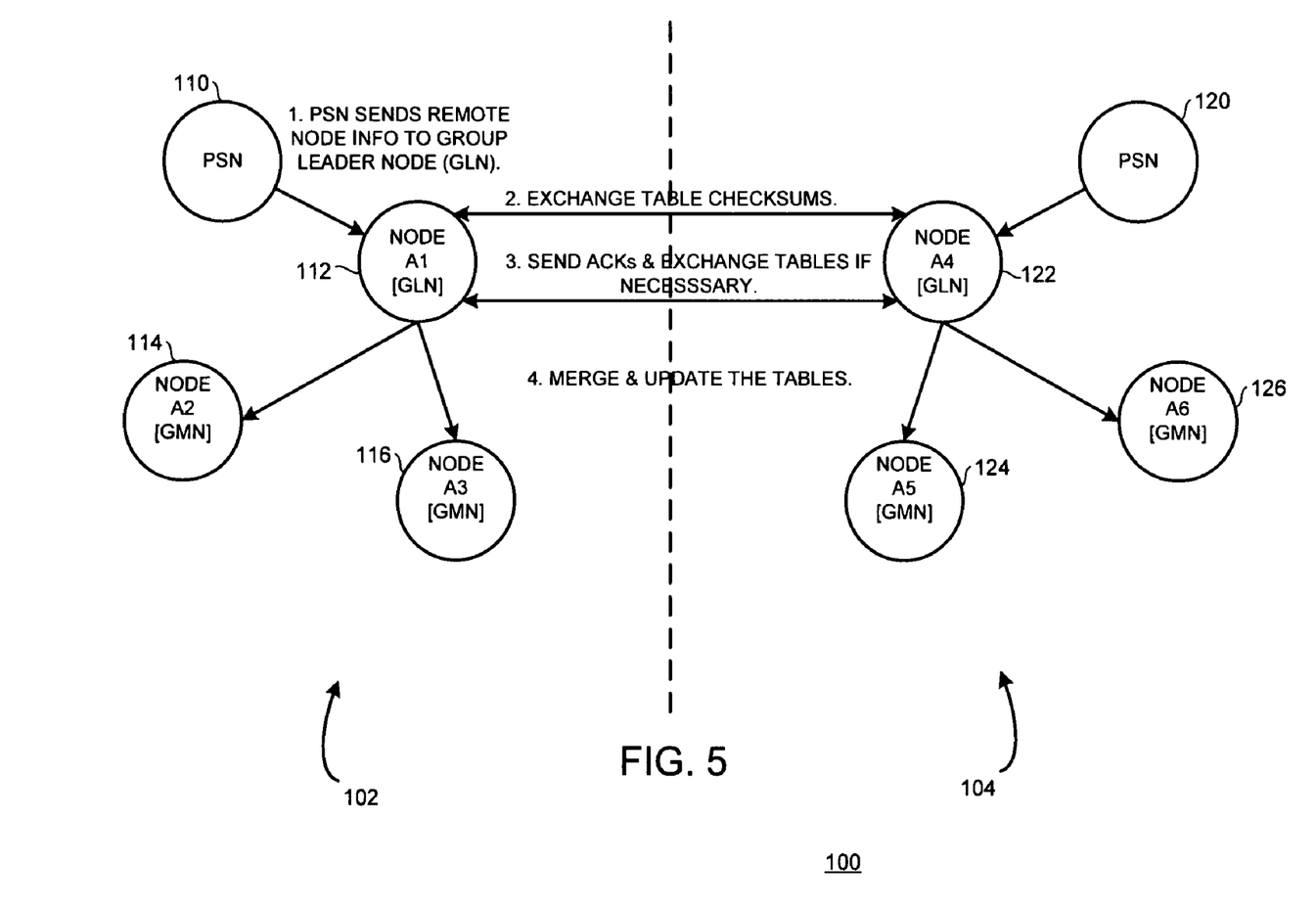
FIG. 5 is a schematic diagram illustrating a joining of two clusters into a single network.

FIG. 5 is a schematic diagram illustrating a joining of two clusters into a single network. In FIG. 5, a network 100 may include a local cluster 102 and a remote cluster 104. Local cluster 102 includes a local PSN 110, a local group leader node (GLN) 112 in organization A, and two local group member nodes (GMN) 114, 116 in organization A. Remote cluster 104 includes a remote PSN 120, a remote group leader node (GLN) 122 in organization A, and two remote group member nodes (GMN) 124, 126 in organization A.

When multiple clusters come together to effect an initial data base synchronization, group leader nodes in the same organization may exchange table checksums. If the table checksums do not match, group leader nodes in a respective organization exchange tables to merge. After the table merge is completed on the group leader nodes, the changes may be propagated to all nodes within the same group from the respective group leader nodes in each cluster. The sequence relating to a joining of two clusters into a single network is substantially as follows:

1. Remote Cluster Discovery: Autoconfig process sends information from the data base server unit on the local cluster PSN 110 to local cluster GLN 112.
2. Table Checksum Exchange: When local GLN 112 in local cluster 102 discovers remote GLN 122 belonging to the same organization A (Note: in some cases, an organization may only exist in one cluster), local GLN 112 sends table checksums to remote GLN 122 belonging to the same organization A.
3. Table Exchange: If local GLN 112 finds the table checksums are mismatched, local GLN 112 sends a CHECKSUM_MISMATCH acknowledgement to remote GLN 122. When remote GLN 122 receives a mismatched acknowledgement, remote GLN 122 sends local GLN 112 its (i.e., remote GLN 122) table for merge.
4. Table Merge: When each GLN 112, 122 receives tables from the other cluster 102, 104, each GLN 112, 122 merges the received tables with the its own tables and updates any differences in the respective databases on respective PSNs 110, 120 as well as updates the databases in respective GMNs in the same cluster (i.e., update GMNs 114, 116 in local cluster 102 and update GMNs 124, 125 in remote cluster 104).

Figure 6:
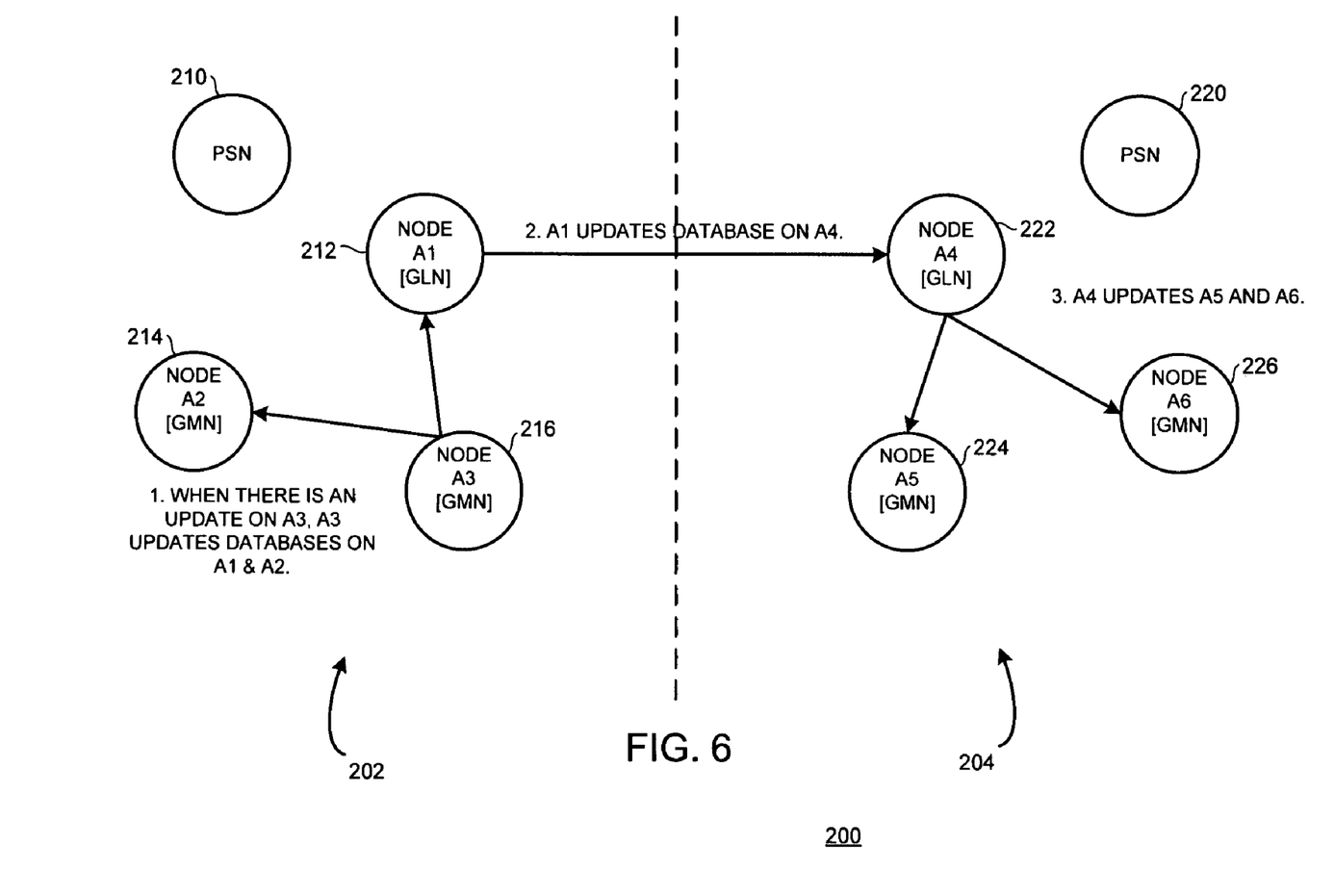
FIG. 6 is a schematic diagram illustrating a promulgating of an update within a network including two clusters.

FIG. 6 is a schematic diagram illustrating a promulgating of an update within a network including two clusters. In FIG. 6, a network 200 may include a local cluster 202 and a remote cluster 204. Local cluster 202 includes a local PSN 210, a local group leader node (GLN) 212 in organization A, and two local group member nodes (GMN) 214, 216 in organization A. Remote cluster 204 includes a remote PSN 220, a remote group leader node (GLN) 222 in organization A, and two remote group member nodes (GMN) 224, 226 in organization A. During or after initial database synchronization any new database updates on any nodes may be replicated on all the nodes in the same organization substantially according to the following sequence:

1. When there is a data base update is effected on node 216 (i.e., node A3: node 3 of organization A) node 3 in organization A (A3), node 216 effects updates of data bases on nodes 214, 212 (i.e., other nodes A1, A2 in the same organization in the same cluster).
2. Local group leader node 212 (GLN node A1) then updates the data base on the remote GLN 222 (GLN node A4).
3. Remote GLN 222 updates the database on all the group member nodes 224, 226 in the same organization in remote cluster 204 (i.e., nodes A5 and A6).

Figure 7:
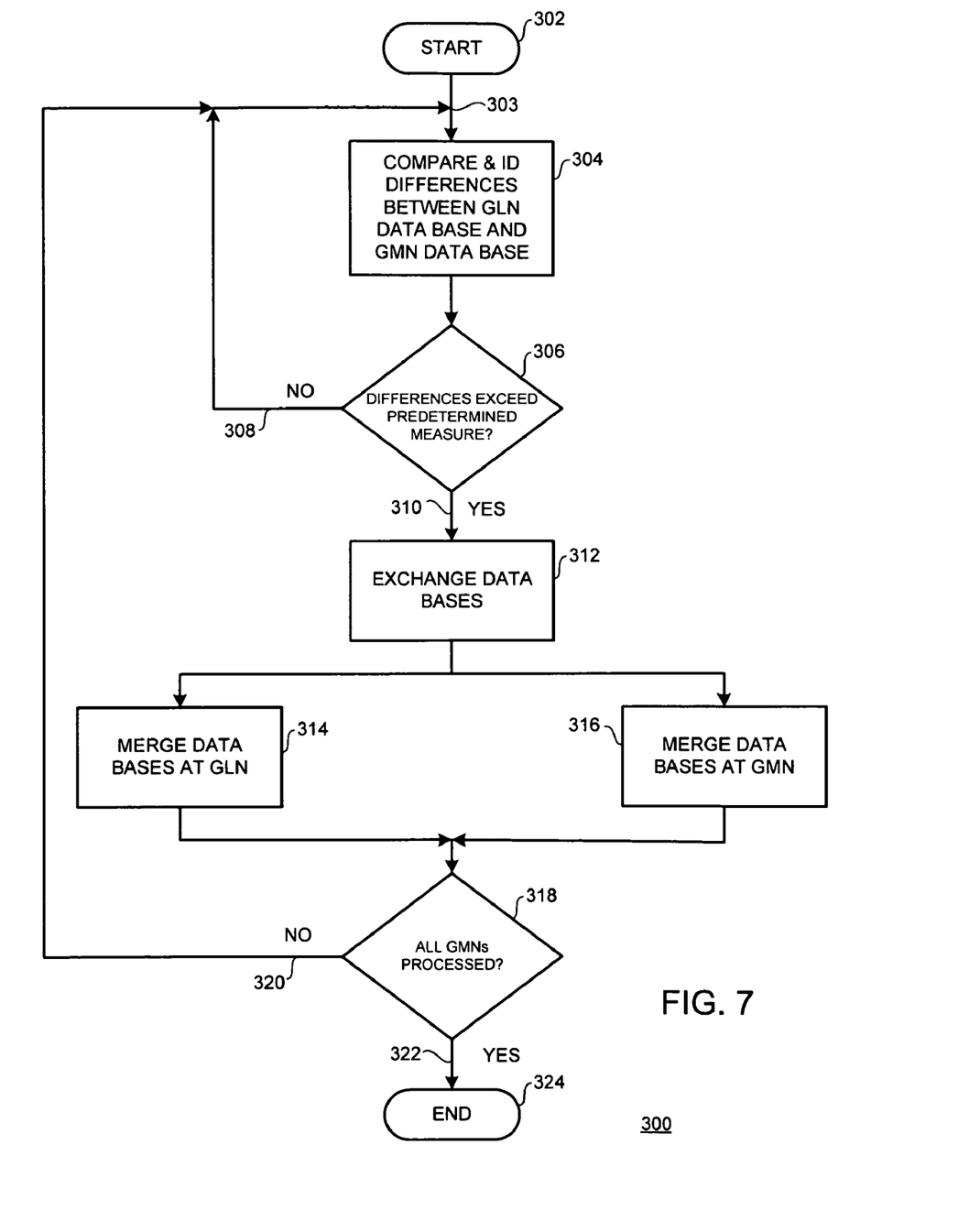
FIG. 7 is a flow diagram illustrating a method for synchronizing a data base at a plurality of nodes in an ad hoc network.

FIG. 7 is a flow diagram illustrating a method for synchronizing a data base at a plurality of nodes in an ad hoc network. In FIG. 7, a method 300 for synchronizing a data base at a plurality of nodes communicatingly linked in an ad hoc network begins at a START locus 302. The network includes at least one authentication authority node group of the plurality of nodes. Each respective authentication authority node group of the at least one authentication authority node group including a respective group leader node and at least one group member node.

Method 300 continues with, in each respective authentication authority node group, comparing and identifying differences between at least one predetermined aspect of the data base at the respective group leader node and the at least one predetermined aspect of the data base at each respective group member node, as indicated by a block 304.

Method 300 continues with, for each comparing, posing a query whether the differences identified exceed a predetermined measure, as indicated by a query block 306. If the differences identified do not exceed the predetermined measure, method 300 proceeds from query block 306 via a NO response line 308 to a locus 303. Method 300 proceeds from locus 303 to carry out steps indicated by blocks 304, 306. If the differences identified exceed the predetermined measure, method 300 proceeds from query block 306 via a YES response line 310 to effect exchanging data bases between the group leader node and the group member node, as indicated by a block 312.

Method 300 continues with, for each comparing, in no particular order: (1) merging the group leader node data base with the group member data base at the group leader node to create a group leader node merged data base, as indicated by a block 314; and (2) merging the group member node data base with the group leader data base at the group member node to create a group member node merged data base, as indicated by a block 316.

Method 300 continues by posing a query whether all group member nodes have been processed, as indicated by a query block 318. If all group member nodes have not been processed, method 300 proceeds from query block 318 via a NO response line 320 and proceeds to locus 303. Method 300 proceeds from locus 303 to carry out steps indicated by blocks 304, 306, 312, 314, 316, 318. If all group member nodes have been processed, method 300 proceeds from query block 318 via a YES response line 322. Method 300 terminates at an END locus 324.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims.

The invention claimed is:

1. A method for performing initial synchronization of databases at each of a plurality of nodes communicatingly linked in an ad hoc network; said network including at least one authentication authority node group of at least two group member nodes of said plurality of nodes; the method comprising:
    (a) using an autoconfiguration process to select a group leader node from said group member nodes in the authentication authority node group;
    (b) coupling said respective group leader node with each respective said group member node in the authentication authority node group;
    (c) receiving, at the group leader node, a predetermined aspect of the database at a group member node;
    (d) generating a predetermined aspect of the database at the group leader node and comparing and identifying differences between at least one predetermined aspect of said data base at said respective group leader node and said at least one predetermined aspect of said data base at each respective said group member node;
    (e) if said differences identified exceed a predetermined measure, synchronizing the data bases of said group leader node and said group member node by:
        (1) receiving the database from the group member node;
        (2) comparing each entry of the group member node database with each entry of the group leader database;
        (3) providing a buffer for the group leader node and the group member node;
        (4) when a mismatch between data from the two nodes is found, storing the data with a more up-to-date timestamp in a buffer for the node having the data with a less up-to-date timestamp;
        (5) updating said group leader node data base with the buffer for the group leader node to create a group leader node merged data base; and
        (6) updating said group member node data base with the buffer for the group member node to create a group member node merged data base;
        wherein the entire merged data base is not transmitted over the network thereby minimizing disk I/O;
    (f) repeating steps (a)-(e) for each group member node in the authentication authority group.

2. The method for performing initial synchronization of databases at a plurality of nodes communicatingly linked in an ad hoc network as recited in claim 1 wherein at least one node of said plurality of nodes is a primary service node; the method further comprising, following step (f):
    (g) for each synchronization between the data base of the group leader node and the data base of a group member node, providing at least one of said group leader merged data base and said group member merged data base to at least one said primary service node.

3. The method for performing initial synchronization of databases at a plurality of nodes communicatingly linked in an ad hoc network as recited in claim 2 wherein each said respective authentication authority node group has a respective primary service node.

4. The method for performing initial synchronization of databases at a plurality of nodes communicatingly linked in an ad hoc network as recited in claim 3 wherein each respective node of said plurality of nodes includes a plurality of functional components coupled with a data base server unit.

5. The method for performing initial synchronization of databases at a plurality of nodes communicatingly linked in an ad hoc network as recited in claim 4 wherein each said data base server unit is configured for communicating with at least said respective group leader node and at least one respective group member node.

6. The method for performing initial synchronization of databases at a plurality of nodes communicatingly linked in an ad hoc network as recited in claim 1 wherein each respective node of said plurality of nodes includes a plurality of functional components coupled with a data base server unit.

7. The method for performing initial synchronization of databases at a plurality of nodes communicatingly linked in an ad hoc network as recited in claim 6 wherein each said data base server unit is configured for communicating with at least said respective group leader node and at least one respective group member node.

8. A method for synchronizing data bases at a plurality of nodes in an authentication authority node group of an ad hoc network when a new node joins the authentication authority node group; said authentication authority node group being associated with a primary services node (PSN) including a group leader node and at least one group member node; the method comprising:
    (a) sending, by the new node, a node join notification to the PSN;
    (b) receiving, from the PSN, information about the nearest neighbor group member node to the new node;
    (c) sending a predetermined aspect of the database at the new node to the nearest neighbor group member node;
    (d) comparing and identifying differences between at least one predetermined aspect of said data base at said new node and said at least one predetermined aspect of said data base at said nearest neighbor group member node;

(e) if said differences identified exceed a predetermined measure, synchronizing the data bases of said new node and said nearest neighbor group member node; and
  (1) receiving the database from the new node;
  (2) comparing each entry of the new node database with each entry of the nearest neighbor group member database;
  (3) providing a buffer for the new node and the nearest neighbor group member node;
  (4) when a mismatch between data from the two nodes is found, storing the data with a more up-to-date timestamp in a buffer for the node having the data with a less up-to-date timestamp;
  (5) updating said new node data base with the buffer for the new node to create a new node merged data base; and
  (6) updating said nearest neighbor group member node data base with the buffer for the nearest neighbor group member node to create a nearest neighbor group member node merged data base;
  wherein the entire merged data base is not transmitted over the network thereby minimizing disk I/O.

9. The method for synchronizing data bases at a plurality of nodes in an authentication authority node group of an ad hoc network as recited in claim 8 wherein each respective node of said plurality of nodes includes a plurality of functional components coupled with a data base server unit.

10. The method for synchronizing data bases at a plurality of nodes in an authentication authority node group of an ad hoc network as recited in claim 9 wherein each said data base server unit is configured for communicating with at least said respective group leader node and at least one respective group member node.

11. A system for performing initial synchronization of databases at each of a plurality of nodes in an ad hoc network; said network including at least one authentication authority node group of at least two group member nodes of said plurality of nodes; each respective authentication authority node group of said at least one authentication authority node group including a respective group leader node and at least one group member node; the system comprising:
  (a) in each respective node, a respective comparing unit; said respective comparing unit in each respective node of each said respective authentication authority node group comparing and identifying differences between at least one predetermined aspect of said data base at said respective group leader node and said at least one predetermined aspect of said data base at each respective said group member node; in each respective authentication authority node group said respective group leader node being coupled with each respective said group member node;
  (b) in each respective node, a respective communicating unit; if said differences identified exceed a predetermined measure, said respective communicating units for said respective group leader node and said respective group member node synchronizing the data bases of said group leader node and said group member node in cooperation with a data base server unit in each node, by:
    (1) receiving the database from the group member node;
    (2) comparing each entry of the group member node database with each entry of the group leader database;
    (3) providing a buffer for the group leader node and the group member node;
    (4) when a mismatch between data from the two nodes is found, storing the data with a more up-to-date timestamp in a buffer for the node having the data with a less up-to-date timestamp;
    (5) updating said group leader node data base with the buffer for the group leader node to create a group leader node merged data base; and
    (6) updating said group member node data base with the buffer for the group member node to create a group member node merged data base;
    wherein the entire merged data base is not transmitted over the network thereby minimizing disk I/O;
  (f) repeating steps (a)-(e) for each group member node in the authentication authority group.

12. The system for performing initial synchronization of databases at each of a plurality of nodes communicatingly linked in an ad hoc network as recited in claim 11 wherein at least one node of said plurality of nodes is a primary service node; the method further comprising, following step (f):
  (g) for each synchronization between the data base of the group leader node and the data base of a group member node, providing at least one of said group leader merged data base and said group member merged data base to at least one said primary service node.

13. The system for performing initial synchronization of databases at each of a plurality of nodes communicatingly linked in an ad hoc network as recited in claim 12 wherein each said respective authentication authority node group has a respective primary service node.

14. The method for performing initial synchronization of databases at each of a plurality of nodes communicatingly linked in an ad hoc network as recited in claim 13 wherein each respective node of said plurality of nodes includes a plurality of functional components coupled with said data base server unit, and wherein each said data base server unit is configured for communicating with at least said respective group leader node and at least one respective group member node.

15. The system for performing initial synchronization of databases at each of a plurality of nodes communicatingly linked in an ad hoc network as recited in claim 11 wherein each respective node of said plurality of nodes includes a plurality of functional components coupled with said data base server unit.

16. The system for performing initial synchronization of databases at each of a plurality of nodes communicatingly linked in an ad hoc network as recited in claim 15 wherein each said data base server unit is configured for communicating with at least said respective group leader node and at least one respective group member node.

* * * * *